(12) United States Patent
Gliozzo et al.

(10) Patent No.: US 11,080,300 B2
(45) Date of Patent: Aug. 3, 2021

(54) USING RELATION SUGGESTIONS TO BUILD A RELATIONAL DATABASE

(71) Applicant: International Business Machines Corporation, Armonk, NY (US)

(72) Inventors: Alfio Massimiliano Gliozzo, Brooklyn, NY (US); Gaetano Rossiello, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/106,610

(22) Filed: Aug. 21, 2018

(65) Prior Publication Data
US 2020/0065416 A1    Feb. 27, 2020

(51) Int. Cl.
*G06F 16/28* (2019.01)
*G06N 5/00* (2006.01)
*G06F 16/2455* (2019.01)
*G06F 16/2457* (2019.01)

(52) U.S. Cl.
CPC ...... *G06F 16/284* (2019.01); *G06F 16/24564* (2019.01); *G06F 16/24578* (2019.01); *G06N 5/00* (2013.01)

(58) Field of Classification Search
CPC ........... G06F 17/30595; G06F 17/3053; G06F 17/30507; G06N 5/00
USPC ........................................................ 707/802
See application file for complete search history.

(56) References Cited

U.S. PATENT DOCUMENTS

| 5,615,367 A * | 3/1997 | Bennett ................. G06F 16/252 |
| 9,710,544 B1 | 7/2017 | Smith et al. |
| 9,785,887 B2 * | 10/2017 | Bornea .................. G16H 70/60 |
| 2011/0213804 A1 | 9/2011 | Lee et al. |
| 2011/0238711 A1 * | 9/2011 | Schmeink ............... G06F 16/22 |
| | | 707/807 |

(Continued)

FOREIGN PATENT DOCUMENTS

CN    104199972 A    12/2014

OTHER PUBLICATIONS

Heim, Philipp et al. "Interactive Relationship Discovery via the Semantic Web" Conference Paper—Jan. 2010; ResearchGate retrieved at: https://www.researchgate.net/publication/220854202; 16 pgs.

(Continued)

*Primary Examiner* — Hosain T Alam
*Assistant Examiner* — Robert F May
(74) *Attorney, Agent, or Firm* — Cantor Colburn LLP; Anthony Curro (57) ABSTRACT

Aspects of the invention include a system, a computer program product and a computer-implemented method for building a relational database between a first term and a second term. An embedding management system is used to determine a first term set based on the first term and a second term set based on the second term. An entity linking engine and a knowledge base engine are used to determine a relation match for the first term set when a relation of the first term set relates to a term from a second term set and for determining a relation match for the second term set when a relation of the second term set relates to a term from a first term set. A relation ranking engine selects a relation for the relational database having a selected number of matches.

14 Claims, 6 Drawing Sheets

(56) References Cited

U.S. PATENT DOCUMENTS

| | | | |
|---|---|---|---|
| 2012/0005153 A1* | 1/2012 | Ledwich | G06Q 10/10 |
| | | | 707/602 |
| 2012/0246175 A1* | 9/2012 | Duan | G06F 16/2471 |
| | | | 707/749 |
| 2013/0086460 A1* | 4/2013 | Folting | G06F 9/44 |
| | | | 715/212 |
| 2015/0286720 A1* | 10/2015 | Walsh | G06F 16/122 |
| | | | 707/804 |
| 2016/0148116 A1 | 5/2016 | Bornea et al. | |

OTHER PUBLICATIONS

Lin, Yankai et al. "Modeling Relation Paths for Representation Learning of Knowledge Bases"; arXiv preprint arXiv:1506.00379 (2015); 10 pgs.

Nguyen, Dat Quoc et al. "Neighborhood Mixture Model for Knowledge Base Completion", Proceedings of the 20th SIGNLL Conference on Computational Natural Language Learning (CoNLL), Aug. 7-12, 2016; pp. 40-50.

Pirro, Giuseppe "Explaining and Suggesting Relatedness in Knowledge Graphs*", Institute for High Performance Computing and Networking, Italian National Research Council; In International Semantic Web Conference; 2015; pp. 622-639.

* cited by examiner

Relation Discovery

Discover relations between types

Left Terms
ibm
apple
google

Right Terms
watson
mac
android

Exp. size: 10

[Discover] [Reset]

■ Extraction results

Search:

| Label | URI | Score | # instances |
|---|---|---|---|
| computing platform | dbo:computingPlatform | 90.77718532308306 | 51577 |
| developer (inv) | dbo:developer (inv) | 49.81588603876 | 28767 |
| product | dbo:product | 45.89557463115734 | 45780 |
| developer | dbo:developer | 24.619236175414315 | 28767 |
| license | dbo:license | 20.17952817701643 | 9740 |
| operating system (inv) | dbo:operatingSystem (inv) | 13.01648147381705 | 11960 |
| manufacturer (inv) | dbo:manufacturer (inv) | 10.88465526140918 | 20152 |
| language | dbo:language | 8.01996507348360 | 105911 |
| industry | dbo:industry | 7.50109755717062 | 50100 |

Showing 1 to 9 of 9 entries 1 row selected

[Previous] [Next]

USING RELATION SUGGESTIONS TO BUILD A RELATIONAL DATABASE

BACKGROUND

The present invention relates generally to a method of building a relational databases and, more specifically, to a computer-implemented methods, systems and computer program products configured to suggest a relation between two terms in order to build the relational database.

A relation provides a meaningful connection between two terms that are otherwise unconnected. A database of relations can be formed in order to connect stored terms, thereby allowing a computational connection between terms. Asking an operator or user to enter relations manually can be slow and biased. Methods that consider only the terms and not the context of the terms can also produce unusual results. There is a need to provide relations between terms that is free of the bias of the data entry operator.

SUMMARY

Embodiments of the present invention are directed to a computer-implemented method for building a relational database between a first term and a second term. The method includes: determining, using an embedding management system, a first term set based on the first term; determining, using the embedding management system, a second term set based on the second term; determining, using an entity linking engine and a knowledge base engine, a relation match for the first term set when a relation of the first term set relates to a term from a second term set; determining, using the entity linking engine and the knowledge base engine, a relation match for the second term set when a relation of the second term set relates to a term from a first term set; and selecting, using a relation ranking engine, a relation for the relational database having a selected number of matches.

Embodiments of the present invention are directed to a system for building a relational database between a first term and a second term. The system includes a memory having computer readable instructions, and one or more processors for executing the computer readable instructions. The computer readable instructions include: determining one or more relations based on a first term set including the first term, determining one or more relations based on a second term set including the second term, determining a relation match for the first term set when a relation of the first term set relates to a term from a second term set, determining a relation match for the second term set when a relation of the second term set relates to a term from a first term set, and selecting a relation for the relational database having a selected number of matches.

Embodiments of the present invention are directed to a computer program product for building a relational database, the computer program product comprising a computer readable storage medium having program instructions embodied therewith. The program instructions are executable by a processor to cause the processor to perform a method including: determining one or more relations based on a first term set including the first term, determining one or more relations based on a second term set including the second term, determining a relation match for the first term set when a relation of the first term set relates to a term from a second term set, determining a relation match for the second term set when a relation of the second term set relates to a term from a first term set, and selecting a relation for the relational database having a selected number of matches.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a knowledge base is a library of information about a topic, product, person, thing, etc., stored in a computer system. Knowledge base construction is the process of populating a knowledge base with facts extracted from data. For example, one may want to build a medical knowledge base of people's relationships, a knowledge base of cities and countries, a knowledge base of manufacturer's and products, etc. Computational methods, such as machine learning, benefit from being able to form relations between sets of entities.

An entity is an object in the real world, such as a person, an animal, a time period, a location, etc. A knowledge base stores a term to represent the entity. Exemplary knowledge bases include DBPedia, Wikidata and Freebase. These knowledge bases include structured content from various sources and information databases and allow users to semantically query relationships and properties within the databases, including links to other related datasets. Relations are formed between terms of the knowledge base in order to provide meaningful information to a user.

Linking entities is performed by finding a relation between terms. Entities however can have several relations. For example, the entities "Oslo" and "Norway" can be related by "is a city in" or "is the capital of" or "is the most populous city in". Often, terms are linked in a knowledge base using a single relation or relations that already exist in a knowledge base. The knowledge base therefore do not grow its level of information.

Turning now to an overview of the aspects of the invention, one or more embodiments of the invention address the above-described shortcomings of the prior art by providing computer-implemented methods, systems, and computer program products configured to suggest a relation between two entities of a knowledge base, whereas the relation need not be currently in the knowledge base and can be added to the knowledge base. Embodiments of the invention provides an unsupervised method for predicting a relation between terms. A relation can be determined for terms that are not directly related in an existing knowledge base. Embodiments of the invention suggests a plurality of relations which are ranked in order to determine an applicability of the relation to two terms.

The method produces relation suggestion by determining a first expanded set of terms for a first term and a second expanded set of terms for a second term. The expanded sets are then used to search databases for possible relations. Use of expanded data sets produces more possible relations than use of single terms. Thus, the possible relations can be given a score whenever a relation determined for one of the expanded set of terms corresponds to a relation determined for the other of the expanded set of terms, and a relation can be suggested based on the score.

The above-described aspects of the invention address the shortcomings of the prior art by suggesting a relation between two terms that does not exist in a knowledge base. The new or suggested relation can then be added to the knowledge base, thereby growing the knowledge base and increasing a level of information that can be pulled from the knowledge base. Also, the invention can suggest relations having different levels of generality.

Figure 1:
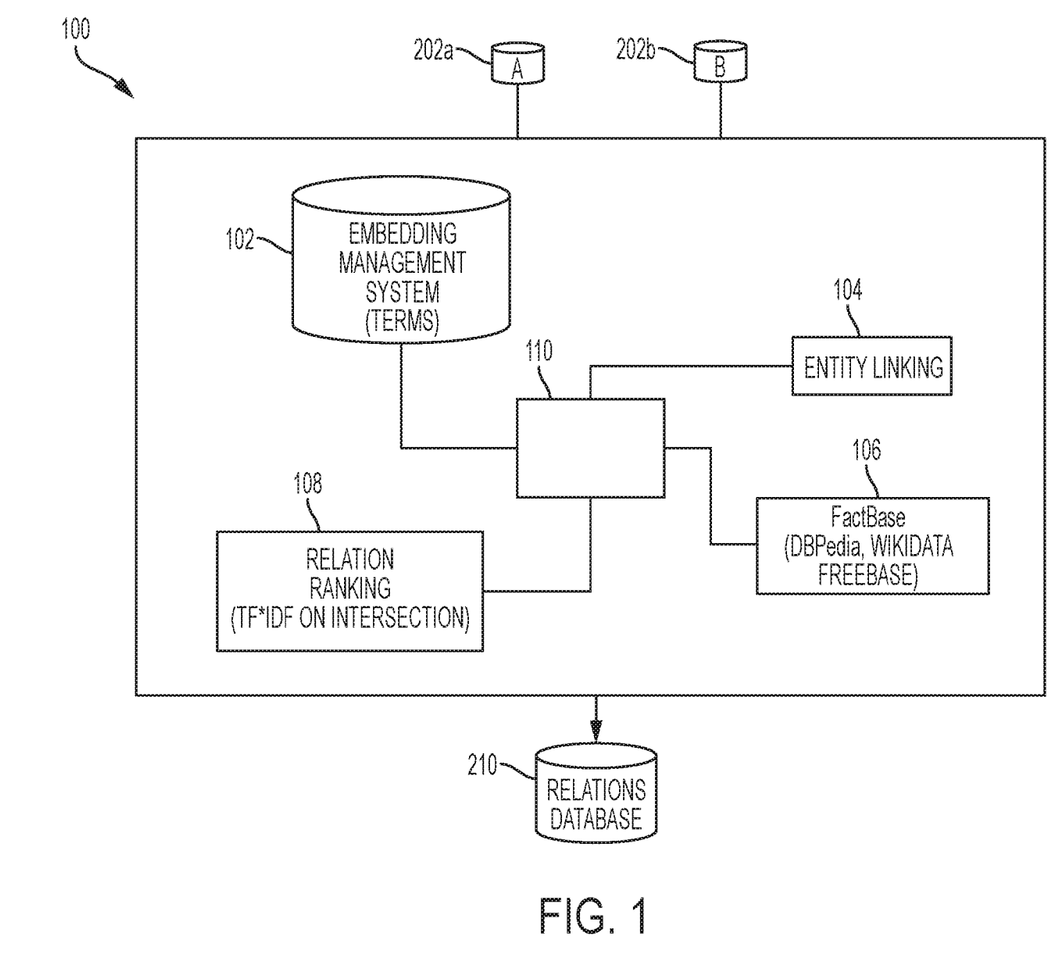
FIG. 1 shows a schematic diagram illustrating a system for suggesting a relation according to an embodiment the present invention.

Turning now to a more detailed description of aspects of the present invention, FIG. 1 depicts a schematic diagram of a system 100 for suggesting a relation is generally shown in accordance with an embodiment. The system 100 includes an embedding management system 102, an entity linking engine 104, a knowledge base engine 106 and a relation ranking engine 108, all of which are accessible by a processor 110. In embodiments of the invention, the engines 104, 106, 108 can also be implemented as so-called classifiers (descried in more detail below). In one or more embodiments of the invention, the features of the various engines/classifiers 104, 106, 108 described herein can be implemented as a computer system 600 shown in FIG. 6, or can be implemented as a neural network (not shown). In embodiments of the invention, the features of the engines 104, 106, 108 can be implemented by configuring and arranging the computer system 600 to execute machine learning (ML) algorithms. In general, ML algorithms, in effect, extract features from received data (e.g., inputs to the engines/classifiers 104, 106, 108) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 202, 204, 206, 208 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilizes additional learning/training methods including, for example, clustering, anomaly detection, neural networks, deep learning, and the like. The method of relation suggestion disclosed herein is an unsupervised learning method.

Returning to the system 100 depicted in FIG. 1, the embedding management system 102 receives a query term and performs a search of a database of terms based on the query term in order to return terms that are similar or have a match to the query term. In various embodiments of the invention, the embedding management system 102 returns terms having the same characteristics or that are in a same typeas the query term. The entity linking engine 104 links terms to other terms by working with the knowledge base engine 106 to search various knowledge bases. The knowledge base engine 106 receives searches various databases or knowledge bases or structured knowledge bases in order to find a relation for various query terms. The relation ranking engine 108 determines or assigns a rank or score indicating a number of relations between two terms.

The processor 110 is in communication with at least two databases (e.g. database A 202a and database B 202b) which can hold various terms for which a relation is to be determined or suggested. Alternatively, the processor 110 may receive terms entered manually via an input device, such as a keyboard. The processor 110 outputs a relation suggestion to a relational database 210, where the suggested relation is between one or more terms from database A 202a and one or more terms from database B 202b. The suggested relations is determined using the embedding management system 102, entity linking engine 104, knowledge base engine 106 and relation ranking engine 108, as discussed below with respect to FIG. 2.

Figure 2:
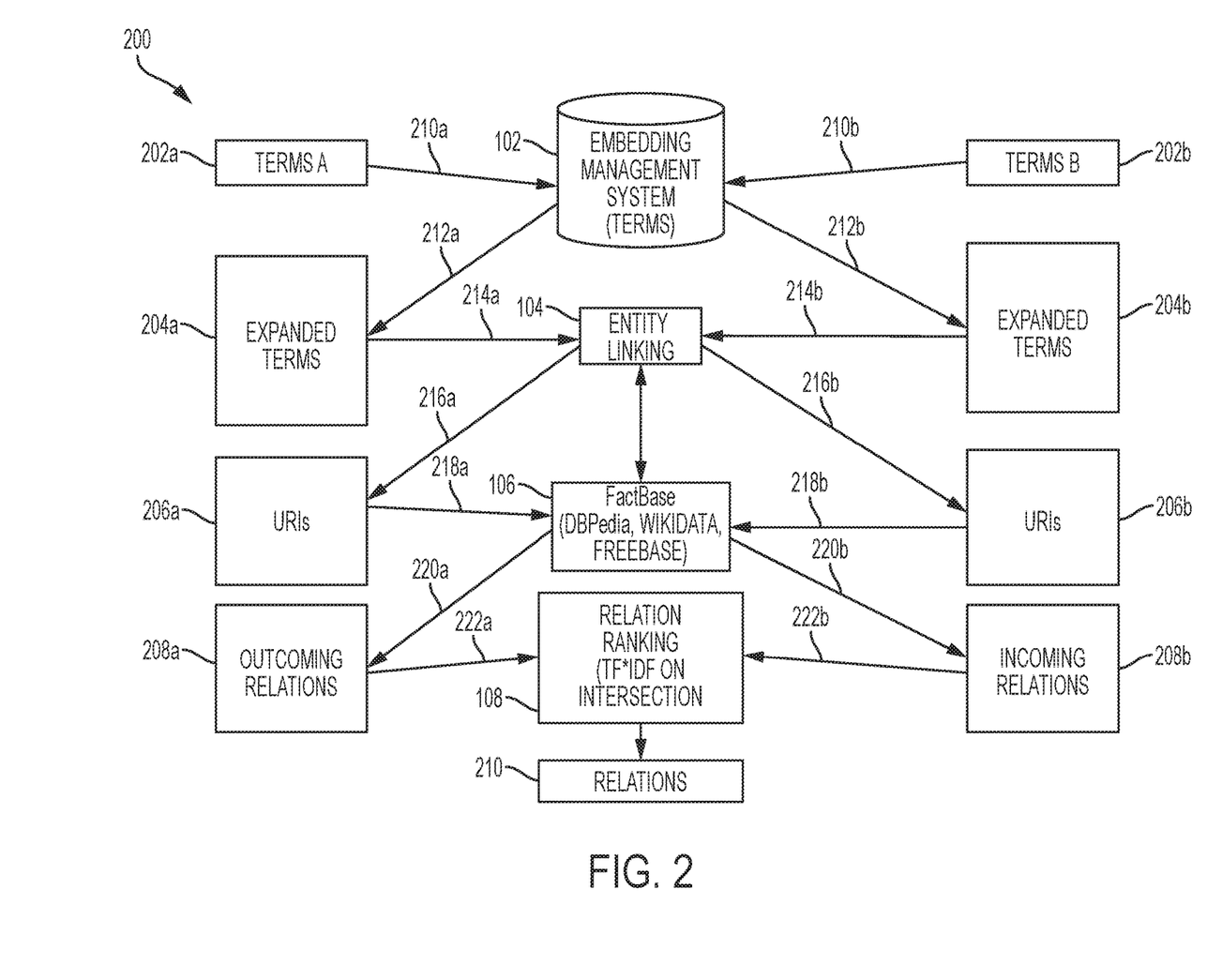
FIG. 2 illustrates a method for suggesting a relation between any two terms using the various engines of the relation suggestion system of FIG. 1.

FIG. 2 illustrates a method for suggesting a relation between any two terms using the various engines of the relation suggestion system 100 of FIG. 1. The method suggests a relation between a first term (Term A) and a second term (Term B). A relation can be in the form of <subject|relation|object>, where Term A serves as the subject and Term B serves as the object. In various embodiments of the invention, Term A and Term B can be terms that are drawn from a first database 202a and a second database 212a. Alternatively, Term A and Term B can be entered manually by an operator and an input device. Also, Term A can refer to a plurality of terms provided as a group and Term B can be a plurality of terms provided as a group.

In a first step (indicated by arrows 210a), the first term (Term A) is obtained from the first database 202a and the second term (Term B) from the second database 202b. The first term (Term A) is provided as a query term to the Embedding Management System 102, which finds similar terms to Term A and outputs (arrow 212a) the similar terms. The Embedding Management System 102 acts on Term A to provide a first expanded set of terms 204a related to Term A. Similarly, the second term (Term B) is provided (arrow 210b) as a query term to the Embedding Management System 102 which outputs (arrow 212b) a second expanded set of terms 204b related to Term B.

The first expanded set of terms 204a is provided (arrow 214a) to the entity linking engine 104. The entity linking engine 104 works with the knowledge base search engine 106 to locate and return (arrow 216a) a first set of uniform resource identifiers (URIs) 206a for the terms in the first expanded set of terms 204. The URI is a link to a location in a knowledge base for a selected term. Similarly, the second expanded set of terms 204b is provided (arrow 214b) to the entity linking engine 104 which works with the knowledge base search engine 106 to locate and return (arrow 216b) a second set of URIs 216 related to the terms in the second expanded set of terms 204.

Conceptually, for each term in the first expanded set of terms 204a, the entity linking engine 104 returns one or more URIs, with each URI linking the term (serving as a subject) to a plurality of objects. For each term in the second expanded set of terms 204b, the entity linking engine 104 return one or more URIs, with each URI linking the term (serving as an object) to a plurality of subjects.

In a subsequent step, the first set of URIs 206a is provided (arrow 218a) to the knowledge base search engine 108 and the second set of URIs 206b is provide (arrow 218b) to the knowledge base search engine 108. Each URIs of the first set of URIs 206a are compared to the second set of URIs 206a to find where there is a match. The knowledge base search engine 108 locates one or more relations (Outcoming Relations 208) in the knowledge base for each of the URIs of the first set of URIs. Similarly the second set of URIs is provided to the knowledge base search engine 108 in order to provide one or more relations (Incoming Relations 218) for each of the URIs in the second set of URIs.

Figure 3:
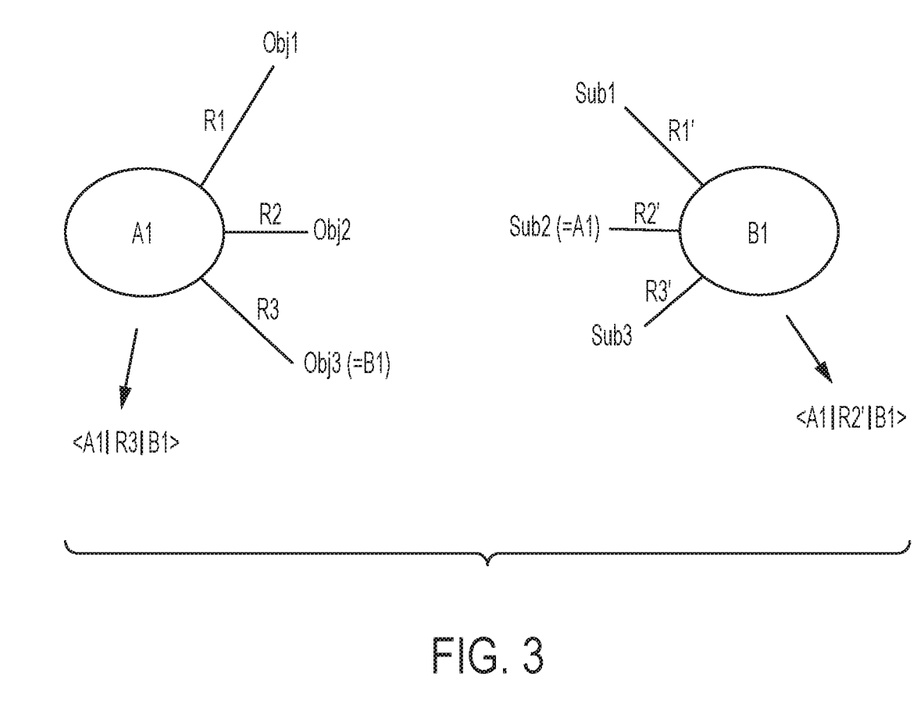
FIG. 3 schematically illustrates a method of location a match at the knowledge base search engine for a relation.

FIG. 3 schematically illustrates a method of location a match at the knowledge base search engine 108 for a relation. An exemplary term A1 from the first set of URIs 206a is shown with various previously-determined relations. The term A1 has a relation R1 to Object 1, has a relation R2 to Object 2 and has a relation R3 to Object 3. Similarly, an exemplary term B1 from the second set of URIs 206b is shown with various previously-determined relations. The term B1 has a relation R1' to Subject 1, has a relation R2' to Subject 2 and has a relation R3' to Subject 3. For illustrative purposes, the third object ("Obj3") is the same as the term B 1. Therefore, a term from the 'A' side has a relation (i.e., R1) to a term from the 'B' side. This relation can then be stored at the Outcoming Relations (208a). Similarly, for illustrative purposes, the second subject ("Sub2") is the same as the term A1. Therefore, a term from the 'B' side has a relation (i.e., R2') to a term from the 'A' side. This relation can be stored at the Incoming Relations 208b.

Returning to FIG. 2, the Outcoming Relations 208a and the Incoming Relations 208n are provided to the relation ranking engine 108. The relation ranking engine 108 determines a number of instances or matches between URIs of the Outcoming Relations 208a and URIs of the Incoming Relations 208b. A rank is provided to each of the relations, whereas the ranks is proportional to the number of instances or matches. In various embodiments of the invention, the ranks is a count of the number of matches.

Once ranks have been assigned to the relations, a selection is made of those relations having the n-highest ranks. These relations are used in order to suggest a relation that can be stored in the relational database 210.

The suggested relation is a suitable relation between the Term A and Term B. The relation can be stored in the knowledge base as a term. In various embodiments of the invention, the suggested triple (<subject, suggested relation, object>) is that uses the relation to form a meaningful connection between subject and object is not in the knowledge base but can be added to the knowledge base in order to grow or expand the knowledge base.

Figure 4:
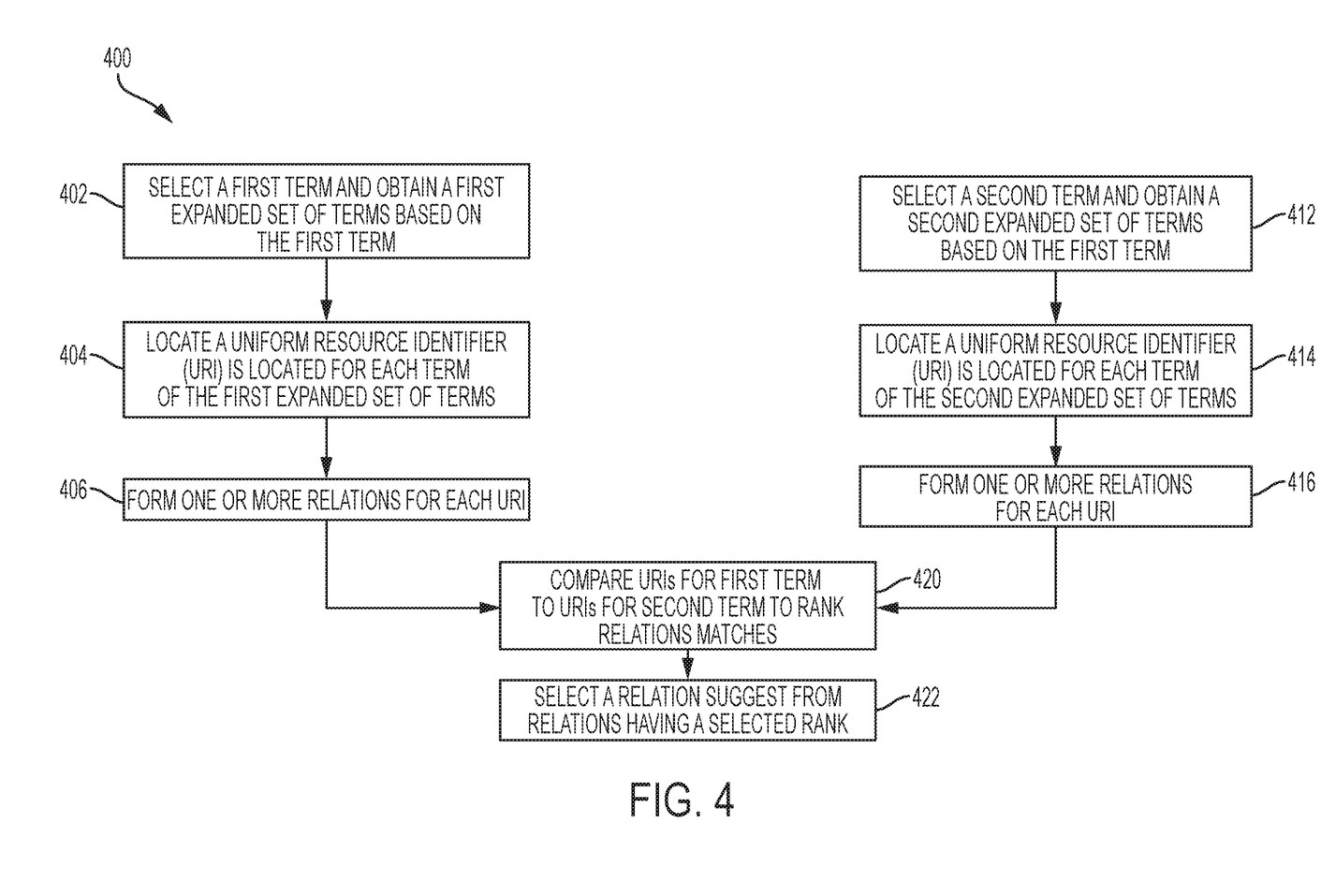
FIG. 4 shows a flowchart 400 illustrating the method of suggesting a relation using the methods disclosed herein.

FIG. 4 shows a flowchart 400 illustrating the method of suggesting a relation using the methods disclosed herein. In box 402, a first term is selected and an expanded set of terms are constructed from the first term. In box 404, a uniform resource identifier (URI) is located for each term of the first expanded set of terms. In box 406, the URIs are provided to a knowledge graph to form one or more relations for the first term.

In box 412, a second term is selected and an expanded set of terms are constructed from the second term. In box 414, a uniform resource identifier (URI) is located for each term of the second expanded set of terms. In box 416, the URIs are provided to a knowledge graph to form one or more relations for the second term.

In box 420, the relations for the first term and the relations for the second term are compared to each other. For each matching relation an instance of the match is recorded. A score is assigned to matching relations in order to rank those matching relations. In box 422, a matching relation having a highest score can be used to suggest a relation. Alternatively, one can select those matching relations having the N highest scores, where N is a selected number.

Figure 5:
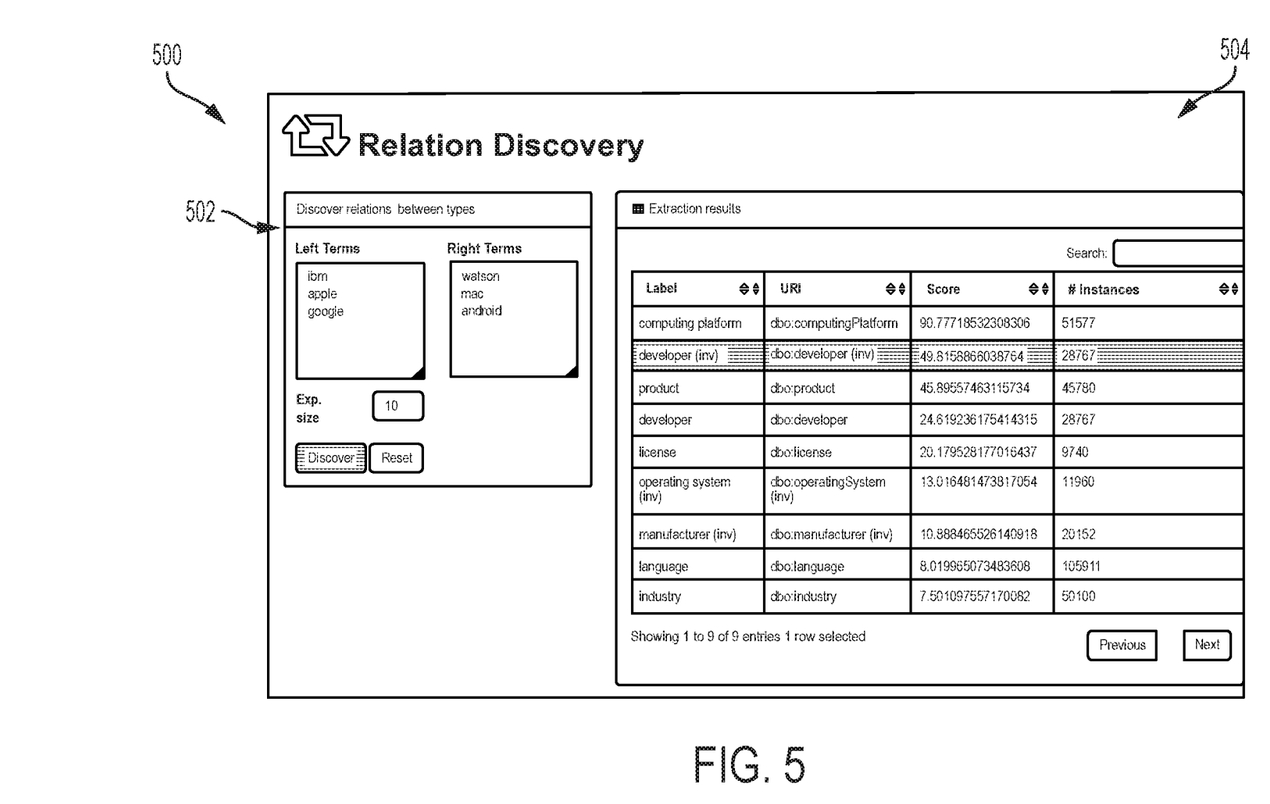
FIG. 5 shows an illustrative interface for determining a relations between terms.

FIG. 5 shows an illustrative interface for determining a relations between terms. An illustrative set of terms are shown in an input box 502. The illustrative set of terms includes a first set {ibm, apple, google} and a second set {Watson, mac android}. An output box 504 shows various relations determined between the first set and the second set using the system and methods disclosed herein. The output box has various relations {computing platform, developer, product, . . . } as well as the various scores determined for the relations (e.g., "computer platform" has a score of about 90.8, "developer" has a score of about 49.8 and "product" has a score of about 45.9, and so on). The top relation (e.g., computer platform can then be added to a knowledge base in order to provide a relation between these terms. In an alternate embodiment of the invention, the top n scores may be selected. If n=3, the "computing platform", "developer", and "product" are selected.

Figure 6:
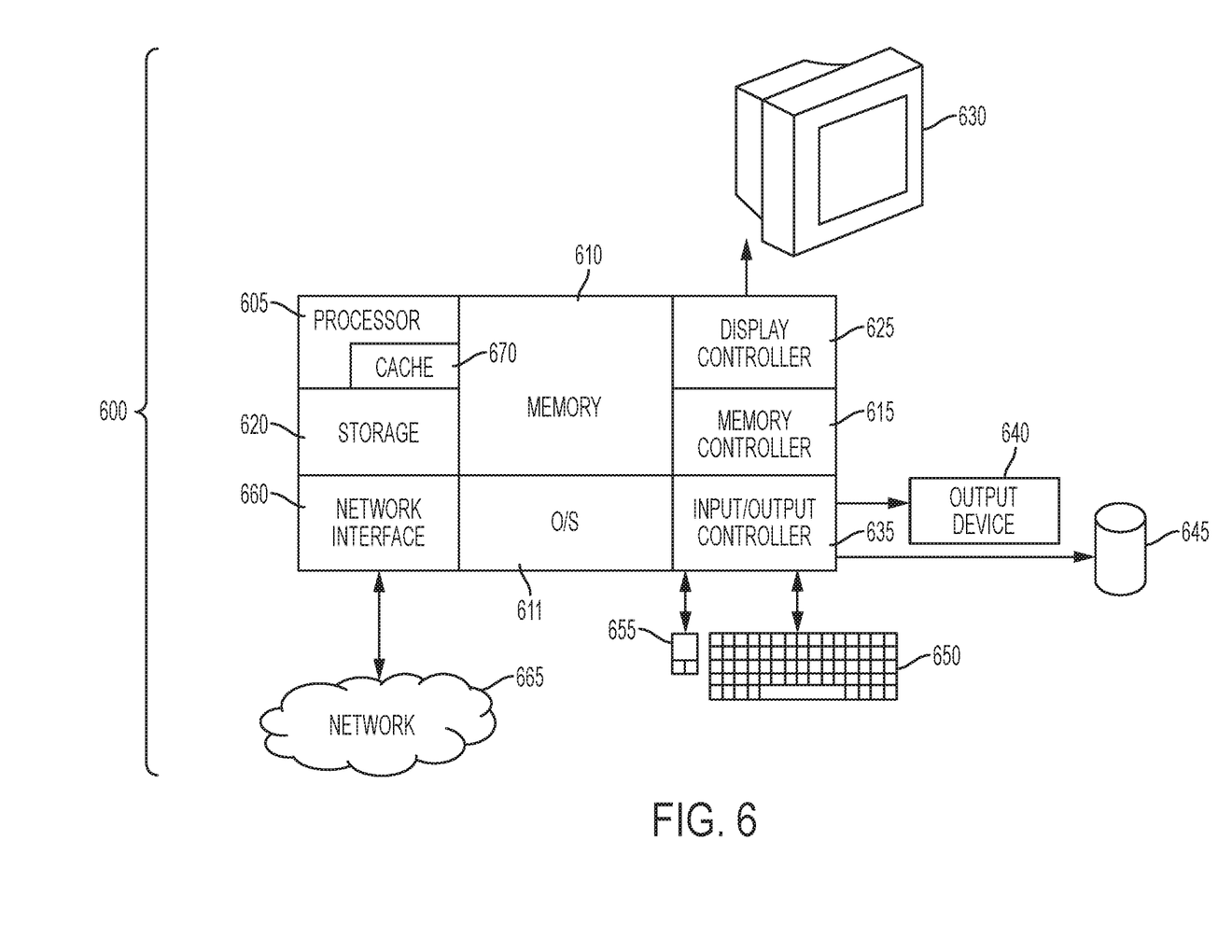
FIG. 6 depicts a block diagram of a computer system for implementing some or all aspects of the system, according to some embodiments of this disclosure.

FIG. 6 illustrates a block diagram of a computer system 600 for use in implementing a system or method according to some embodiments of the invention. The systems and methods described herein may be implemented in hardware, software (e.g., firmware), or a combination thereof. In some embodiments of the invention, the methods described may be implemented, at least in part, in hardware and may be part of the microprocessor of a special or general-purpose computer system 600, such as a personal computer, workstation, minicomputer, or mainframe computer.

In some embodiments of the invention, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the systems and methods of this disclosure.

The computer system 600 may further include a display controller 625 coupled to a display 630. In some embodiments of the invention, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments of the invention, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 600, such as that illustrated in FIG. 6.

Technical effects and benefits of some embodiments of the invention include determining a triple (<subject, relation, object>) between terms that is not previously known or stored in a knowledge base. Therefore, the methods can be used to grow the knowledge base.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for building a relational database between a first term and a second term, the method comprising: determining, using an embedding management system, a first term set based on the first term and a uniform resource indicator (URI) for each of the terms of the first term set, wherein the first term set includes a set of terms that are related to the first term; determining, using the embedding management system, a second term set based on the second term and a uniform resource indicator (URI) for each of the terms of the second term set, wherein the second term set includes a set of terms that are related to the second term; determining, using an entity linking engine and a knowledge base engine, a relation match for the first term set when a relation of the first term set relates to a term from the second term set and wherein the relation is determined based at least in part on a comparison of the URIs for the terms of the first term set to the URIs for the terms of the second term set; determining, using the entity linking engine and the knowledge base engine, a relation match for the second term set when a relation of the second term set relates to a term from the first term set; selecting, using a relation ranking engine, a relation for the relational database having a selected number of matches, wherein the selected number of matches includes a highest number of matches when compared to other relations having other numbers of matches; and providing an output illustrating the relation between the first term and the second term including the selected number of matches, wherein each of the selected number of matches includes an associated score and a label indicating a type of the relation.

2. The computer-implemented method of claim 1 further comprising determining the first term set by provide the first term to an embedding management engine and determining the second term set by providing the second term to the embedding management engine.

3. The computer-implemented method of claim 1 wherein the URIs are obtained from a factbase engine.

4. The computer-implemented method of claim 3 further comprising using the factbase engine to determine the matched relations.

5. The computer-implemented method of claim 1 further comprising treating the first term set as subjects of a relation and treating the second term set as objects of a relation.

6. A system for building a relational database between a first term and a second term, the system comprising: a memory having computer readable instructions; and one or more processors for executing the computer readable instructions, the computer readable instructions comprising: determining one or more relations based on a first term set including the first term and a uniform resource indicator (URI) for each of the terms of the first term set, wherein the first term set includes a set of terms that are related to the first term; determining one or more relations based on a second term set including the second term and a uniform resource indicator (URI) for each of the terms of the second term set, wherein the second term set includes a set of terms that are related to the second term; determining a relation match for the first term set when a relation of the first term set relates to a term from a second term set and wherein the relation is determined based at least in part on a comparison of the URIs for the terms of the first term set to the URIs for the terms of the second term set; determining a relation match for the second term set when a relation of the second term set relates to a term from a first term set; and selecting a relation for the relational database having a selected number of matches, wherein the selected number of matches includes a highest number of matches when compared to other relations having other numbers of matches; and providing an output illustrating the relation between the first term and the second term including the selected number of matches, wherein each of the selected number of matches includes an associated score and a label indicating a type of the relation.

7. The system of claim 6 further comprising determining the first term set by provide the first term to an embedding management engine and determining the second term set by providing the second term to the embedding management engine.

8. The system of claim 6 further wherein the URIs are obtained from a factbase engine.

9. The system of claim 8 further comprising using the factbase engine to determine the matched relations.

10. The system of claim 6 further comprising treating the first term set as subjects of a relation and treating the second term set as objects of a relation.

11. A computer program product for building a relational database, the computer program product comprising a computer readable storage medium having program instructions embodied therewith, the program instructions executable by a processor to cause the processor to perform a method comprising: determining one or more relations based on a first term set including the first term and a uniform resource indicator (URI) for each of the terms of the first term set, wherein the first term set includes a set of terms that are related to the first term; determining one or more relations based on a second term set including the second term and a uniform resource indicator (URI) for each of the terms of the second term set, wherein the second term set includes a set of terms that are related to the second term; determining a relation match for the first term set when a relation of the first term set relates to a term from a second term set and wherein the relation is determined based at least in part on a comparison of the URIs for the terms of the first term set to the URIs for the terms of the second term set; determining a relation match for the second term set when a relation of the second term set relates to a term from a first term set; and selecting a relation for the relational database having a selected number of matches, wherein the selected number of matches includes a highest number of matches when compared to other relations having other numbers of matches; and providing an output illustrating the relation between the first term and the second term including the selected number of matches, wherein each of the selected number of matches includes an associated score and a label indicating a type of the relation.

12. The computer program product of claim 11 further comprising determining the first term set by provide the first term to an embedding management engine and determining the second term set by providing the second term to the embedding management engine.

13. The computer program product of claim 11 wherein the URIs are obtained from a factbase engine.

14. The computer program product of claim 13 further comprising using the factbase engine to determine the matched relations.

* * * * *